No. 789,537. PATENTED MAY 9, 1905.
J. GROUVELLE & H. ARQUEMBOURG.
ATOMIZING CARBURETER FOR EXPLOSIVE ENGINES.
APPLICATION FILED JULY 3, 1903.

2 SHEETS—SHEET 2.

Witnesses.

Inventors.
Jules Grouvelle
Henri Arquembourg
per Henry Connett
Attorney.

No. 789,537.

Patented May 9, 1905.

UNITED STATES PATENT OFFICE.

JULES GROUVELLE AND HENRI ARQUEMBOURG, OF PARIS, FRANCE.

ATOMIZING-CARBURETER FOR EXPLOSIVE-ENGINES.

SPECIFICATION forming part of Letters Patent No. 789,537, dated May 9, 1905.

Application filed July 3, 1903. Serial No. 164,125.

*To all whom it may concern:*

Be it known that we, JULES GROUVELLE and HENRI ARQUEMBOURG, citizens of the French Republic, residing at 71 Rue du Moulin-Vert, Paris, in the French Republic, have invented certain new and useful Improvements in Constant-Level and Atomizing Carbureters for Explosive-Engines, of which the following is a specification.

This invention relates to improvements applicable to constant-level and atomizing carbureters, particularly when used for automobile vehicles provided with internal-combustion motors.

Figure 1:
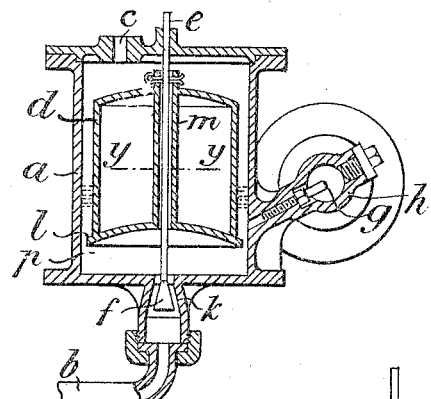
Figure 2:
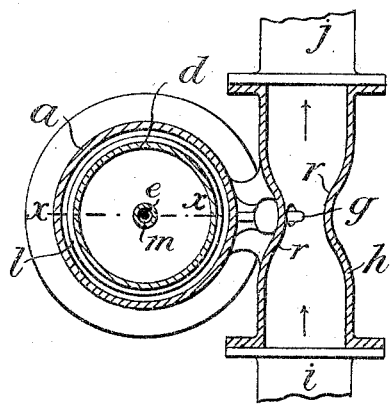

In the accompanying drawings, which illustrate a carbureter embodying our improvements, Figure 1 is a sectional elevation on the line $xx$ in Fig. 2. Fig. 2 is a sectional plan on the line $yy$ in Fig. 1, while Figs. 3, 4, 5, 6, 7, and 8 are views of modifications.

A carbureter embodying this invention comprises a vessel $a$, which may be cylindrical and to which spirit or other inflammable liquid is supplied through a pipe $b$, leading to the bottom of the vessel, the top thereof being formed with an orifice $c$, opening to the atmosphere. Within the vessel $a$ is a float $d$, secured to a central spindle $e$ and adapted to control a valve $f$, whereby the admission of the liquid to the vessel is regulated, the said valve $f$ having, by preference, the form of a truncated cone. A suitable nozzle $g$ conducts a jet of the inflammable liquid from the vessel $a$ to an atomizer $h$, the latter being in connection with a pipe $i$ for supplying fresh air and with a pipe $j$ for carrying off the air when carbureted.

One of our improvements consists in "braking" the float $d$ in order to insure a regular operation thereof notwithstanding the vibration to which it is subjected, (especially when used in connection with automobile vehicles.) Upon the body of liquid and the movable parts of the apparatus being set in motion there is a tendency for the valve $f$ to become jammed upon its seat $k$ or to be held too long off its seat, the result being that the liquid falls below or rises above the desired point, thus interfering with the carbureting process—that is to say, the spraying of the air with liquid hydrocarbon and the formation of an inflammable vapor. In order to avoid these objections, we connect the valve $f$ rigidly with the float $d$ and provide the structure thus formed with a hydraulic brake. This brake may be formed by extending the bottom plate $l$ of the float beyond its body portion, so as to leave only sufficient space, as in Fig. 1, between the edge of the plate and the walls of the containing vessel $a$ to allow the inflammable liquid to pass slowly. As an alternative method the bottom plate $l$ may be extended, as in Fig. 6, so that its edge is in free sliding contact with the walls of the cylinder $a$ and a contracted passage for the liquid formed by means of holes $d'$ in the portion of the plate which projects beyond the body of the float. In order to permit any air-bubbles which may be present in the liquid to escape, the lower surface of the plate $l$ may be concave, and the said plate may be continued upwardly by means of a cylindrical portion $m$, through which the float-rod $e$ is adapted to pass freely.

Figure 4:
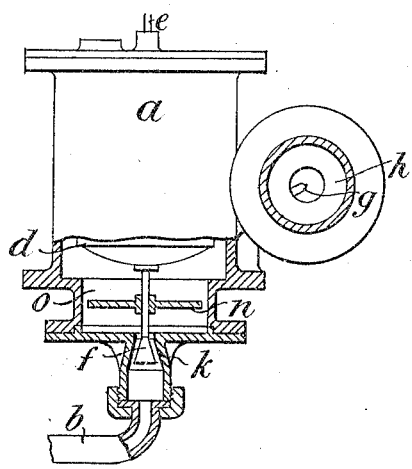
Figure 3:
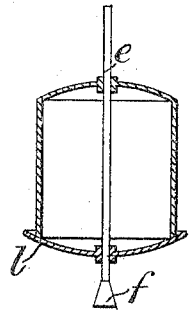
Figure 5:
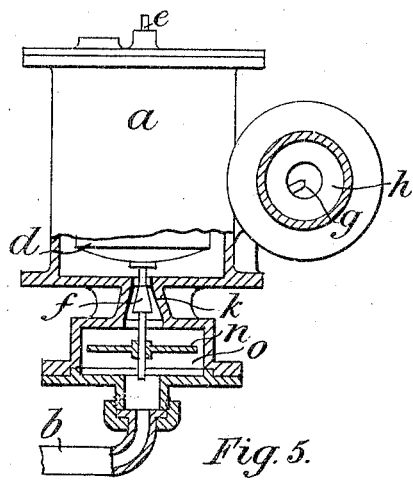
Figure 6:
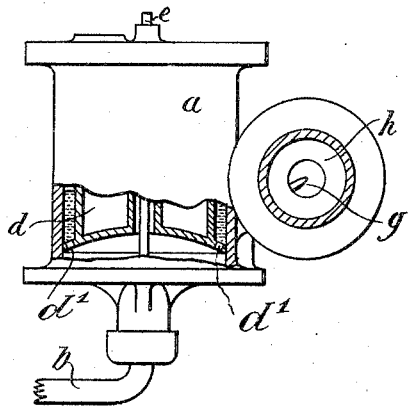
Figure 7:
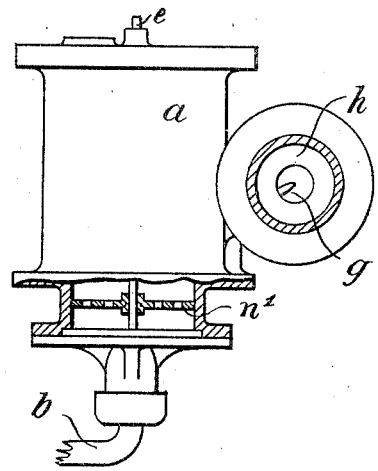
Figure 8:
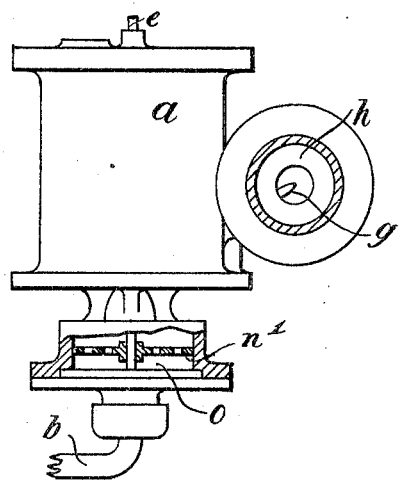

We prefer the construction last described; but modifications embodying the same principle may be employed. For instance, the lower surface of the bottom plate $l$ may be convex, as shown in Fig. 3, to allow the air-bubbles to rise in the usual manner, the said plate being extended so that its edge is in sliding contact with the walls of the cylindrical vessel $a$, holes being provided for the passage of the liquid, or the said plate $l$ may be extended so as to leave room for the liquid to pass slowly between its edge and the walls of the containing vessel $a$, as before described. Instead of or in addition to the extended bottom plate brake-disks $n$ may be secured to the float-rod $e$, so as to work in separate chambers $o$ either above or below the valve $f$, as shown in Figs. 4 and 5, and these disks may be either solid or perforated. Figs. 7 and 8, which are respectively views similar to Figs. 4 and 5, show perforated disks $n'$.

Another improvement consists in the form given to the atomizer $h$. When viewed in longitudinal section, (see Fig. 2,) the inner surface $r$ of the device comprises only symmetrical sinusoidal curves of a special character, and the nozzle $g$, through which the liquid is introduced, enters the atomizer $h$ at its throat or narrowest part. By this construction the atomizer is rendered reversible, so that fresh air may be admitted thereto by way of either of the pipes $i$ or $j$, connected to its ends, and the carbureted air carried off by the pipe $i$ or $j$ at the opposite end. The operation of securing the carbureter in position is by these means facilitated, which is especially desirable in connection with an automobile vehicle. The formation of the atomizer $h$ also affords a direct and easy passage for the fresh air and for the inflammable charge, whereby we avoid the unnecessary loss of charge and pressure which in so many devices for this purpose results in a very prejudicial diminution in the weight of the explosive mixture supplied to the motor. It is certainly necessary to produce a reduction of pressure in the atomizer for the double purpose of drawing in the outer air and of causing the liquid to flow through the nozzle; but it is advantageous that this diminution of pressure should be localized in the vicinity of the end of the nozzle $g$, and this is what we accomplish by forming the atomizer $h$ with sinusoidal curves at $r$, the loss of charge taking place only in the vicinity of the circumference of the narrowest part of the passage.

The atomizer $h$ may be placed at any inclination and will continue to be reversible. The construction of the valve $f$ may be varied, the nozzle $g$ may have one or several jets, and the apparatus may be modified and altered in many respects without affecting the principles underlying our invention.

What we claim as our invention, and desire to secure by Letters Patent, is—

1. A device for the purpose specified having a vessel to contain the volatile liquid, said vessel having a vent-hole, an atomizer, a conduit leading the liquid from said vessel to the atomizer, a valve controlling the admission of the liquid to said vessel, a float in said vessel which operates said valve, and means carried by the float and immersed in the liquid for braking the float.

2. In a constant-level and atomizing carbureter, a vessel for holding spirit or other inflammable liquid, a vent-hole in the vessel, a nozzle leading the liquid from the vessel to an atomizer, a valve controlling the admission of the liquid to the vessel, a float for operating the valve, and a plate projecting from the float so that its edge is in sliding contact with the walls of the vessel, the projecting portion of the plate having perforations to allow for the restricted passage of the liquid.

3. In a constant-level and atomizing carbureter, a vessel for holding spirit or other inflammable liquid, a vent-hole in the vessel, a nozzle leading the liquid from the vessel to an atomizer, a valve controlling the admission of the liquid to the vessel, a float to which the valve is secured by a rod, a bottom plate projecting beyond the body portion of the float to restrict the passage of the liquid and provided with a concave under surface, and an upwardly-extending tubular portion through which the valve-rod passes freely to allow for the escape of air from the liquid.

In testimony whereof we have signed our names to this specification in the presence of two subscribing witnesses.

JULES GROUVELLE. [L. S.]
HENRI ARQUEMBOURG. [L. S.]

Witnesses:
　EDOUARD CARÉNON,
　GABRIEL MAREAU.